United States Patent Office 3,254,087
Patented May 31, 1966

3,254,087
4-(TRIFLUOROMETHYLANILINO)PYRIMIDINE-5-CARBOXYLIC ACID DERIVATIVES
Peter F. Juby, Syracuse, N.Y., assignor to Bristol-Myers Company, New York, N.Y., a corporation of Delaware
No Drawing. Filed Dec. 16, 1963, Ser. No. 330,555
5 Claims. (Cl. 260—256.4)

This invention relates to certain novel compounds useful as anti-inflammatory agents and, more particularly, to 4 - (trifluoromethylanilino)pyrimidine - 5 - carboxylic acids and their esters and salts.

It was the object of the present invention to provide novel and nontoxic anti-inflammatory agents.

The object of the present invention has been achieved by the provision, according to the present invention, of an acid of the formula

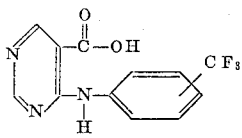

and nontoxic, pharmaceutically acceptable salts and (lower)alkyl esters thereof; and of processes for the preparation thereof.

The preferred embodiment of the present invention is the series of acids of the formula

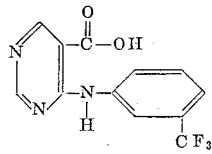

and their nontoxic, pharmaceutically acceptable salts and (lower)alkyl esters.

The compounds of the present invention are prepared by the reaction of 4-chloro-5-ethoxycarbonylpyrimidine [Chem. Ber. 95, 803 (1962)], with the appropriately substituted aniline, preferably by heating, as to reflux, in an inert solvent such as benzene. Roughly two moles of the aniline are used per mole of the pyrimidine or, if desired, equimolar amounts are used with the addition of a mole of a typical hydrogen halide acceptor such as a tertiary amine or an alkali metal carbonate. In the former case, a mole of the aniline hydrogen halide precipitates by the end of the reaction and is removed, as by filtration. The reaction product is isolated by such means as filtration or freeze-drying or evaporation of the solvent in vacuo. The ethyl ester so produced is easily saponified in the usual manner, e.g. with aqueous potassium hydroxide, to give the free acid. Reaction with one equivalent of alkali converts the free acid to a salt. The free acid can also be converted by conventional means to other esters.

The anilines used in the process of the present invention are either commercially available or are described in the literature or may be prepared according to the methods described in volume III of Richter-Auschutz, The Chemistry of the Carbon Compounds, third English edition, Elsevier Publishing Co., Inc., New York, N.Y. (1946), and similar texts.

Typical examples of nontoxic, pharmaceutically acceptable salts include the salts of the alkali metals, the alkaline earth metals, ammonia and substituted ammonia, i.e., amines.

As used herein the term (lower)alkyl signifies monovalent aliphatic radicals, whether branched or unbranched, which contain from one to six carbon atoms, inclusive, e.g. methyl, ethyl, propyl, isopropyl, n-butyl, sec.-butyl, tert.-butyl, isobutyl, n-hexyl, isohexyl, etc.

Anti-inflammatory tests of the compounds of the present invention were carried out on rats using the carrageenin-induced foot edema test of Charles A. Winter et al., Carrageenin-Induced Edema in Hind Paw of the Rat as an Assay for Anti-inflammatory Drugs, Proceedings of the Society for Experimental Biology and Medicine, 111, 544 (1962). The compound under investigation was given orally to the rat at a dose of 100 mg./kg., unless indicated otherwise, and one hour later carrageenin was injected subcutaneously into one paw. Three hours later the degree of edema was measured volumetrically by fluid displacement and compared to that of the control paw to give a result presented in terms of percentage inhibition of edema. Any result of more than 30% inhibition was greater than three times the standard deviation of the result in control animals and thus clearly indicated anti-inflammatory activity.

The percentage inhibition of edema observed with standard compounds at the same dosage was aspirin, 24%; phenylbutazone, 55%; and flufenamic acid, 47%.

Flufenamic acid has the structure

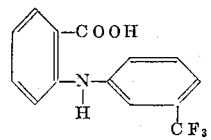

and has been described, for example, in South African patent application R 61/832.

In the test described above the preferred compound of the present invention having the formula

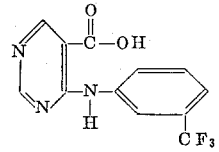

gave about 61% inhibition of edema both as the free acid and in the form of the sodium or potassium salt; its ethyl ester gave 46% inhibition and its methyl ester gave an average of 45% inhibition when the latter was tested at a dose of 150 mgm./kg.

This result was surprising in view of the fact that no significant inhibition of edema was produced by the corresponding compounds containing a methyl or phenyl group at the 2-position of the pyrimidine ring, in the corresponding compound lacking the trifluoromethyl group, in the corresponding compound which both lacked the trifluoromethyl group and had a methyl group on the exocyclic nitrogen or in the corresponding compounds in which the trifluoromethyl group was replaced by methyl or an atom of chlorine.

The following examples will serve to illustrate but not to limit the present invention. All temperatures are given in degrees centigrade.

*Example 1*

5 - ethoxycarbonyl - 4-(α,α,α-trifluoro-m-toluidino)pyrimidine.—α,α,α-Trifluoro-m-toluidine (13.9 g.) was added, with stirring, to a solution of 4-chloro-5-ethoxycarbonylpyrimidine [1] (8.0 g.) in dry benzene (50 ml.). The

[1] H. Bredereck, F. Effenberger and E. H. Schweizer, Chem. Ber., 95, 803 (1962).

solution was heated under reflux for 0.5 hr. The cooled reaction mixture was filtered and the filtrate reduced to dryness on a rotating evaporator. The residual crystalline material was recrystallized from aqueous ethanol to give the product as colorless crystals (11.0 g.), M.P. 72–73°.

*Analysis.*—Calcd. for $C_{14}H_{12}N_3O_2F_3$: C, 54.00; H, 3.89; N, 13.50. Found: C, 54.05; H, 3.90; N, 13.48.

Example 2

*5 - carboxy-4-(α,α,α-trifluoro-m-toluidino)pyrimidine.*—5 - ethoxycarbonyl-4-(α,α,α-trifluoro-m-toluidino)pyrimidine (0.5 g.) was suspended in an aqueous solution of 5% potassium hydroxide (13.0 ml.). The suspension was stirred at room temperature for one hour, then stirred at ca. 80° for a further one hour. The clear solution was cooled and acidified to ca. pH 4 with hydrochloric acid. The precipitated solid was collected and crystallized from wet methanol to give a colorless crystalline solid (0.30 g.), M.P. 232–234°. Recrystallization from wet methanol gave the product as colorless crystals, M.P. 235–237°. An infrared spectrum of the product was consistent with structure.

*Analysis.*—Calcd. for $C_{12}H_8N_3O_2F_3 \cdot \frac{1}{2}H_2O$: C, 49.3; H, 3.08; N, 14.4. Found: C, 49.5; H, 3.16; N, 14.4.

An NMR spectrum confirmed the presence of ½ molecule of water per molecule of acid.

A small sample of the recrystallized material was sublimed at 190°/0.01 mm. to give a colorless crystalline solid, M.P. 236–237°.

*Analysis.*—Calcd. for $C_{12}H_8N_3O_2F_3$: C, 50.89; H, 2.85; N, 14.84. Found: C, 51.10; H, 3.12; N, 15.05.

Example 3

*Potassium 4-(α,α,α-trifluoro-m-toluidino)-5-pyrimidine carboxylate.*—5 - carboxy - 4-(α,α,α-trifluoro-m-toluidino)pyrimidine (2.5 g.) was dissolved in hot n-butanol (75 ml.). 50% (wt. for wt.) potassium 2-ethylhexanoate in n-butanol (3.6 g.) was added to the hot solution. A crystalline solid separated from the solution on cooling. The solid was separated and treated with cold water. The water-insoluble fraction was removed by filtration and the filtrate reduced to dryness on a rotating evaporator. The residual solid was recrystallized from n-butanol to give the product as a colorless crystalline solid (1.4 g.), M.P. 393–395° (decomp.).

*Analysis.*—Calcd. for $C_{12}H_7N_3O_2F_3K$: C, 44.85; H, 2.20; N, 13.08. Found: C, 45.00; H, 2.28; N, 13.12.

Example 4

*Sodium 4 - (α,α,α - trifluoro-m-toluidino)-5-pyrimidine carboxylate.*—5 - carboxy - 4-(α,α,α-trifluoro-m-toluidino)pyrimidine (2.5 g.) was dissolved in hot n-butanol (75 ml.). 42% (wt. for wt.) sodium 2-ethylhexanoate in n-butanol (3.6 g.) was added to the hot solution. The crystalline solid which separated from the solution was collected and recrystallized from aqueous n-butanol to give the product as a colorless crystalline solid (1.5 g.), M.P. >400°.

*Analysis.*—Calcd. for $C_{12}H_7N_3O_2F_3Na$: C, 47.22; H, 2.31; N, 13.77. Found: C, 47.35; H, 2.35; N, 14.00.

Example 5

*5 - methoxycarbonyl-4-(α,α,α-trifluoro-m-toluidino)pyrimidine.*—5 - carboxy - 4-(α,α,α-trifluoro-m-toluidino)pyrimidine (3.0 g.) was suspended in ether (60 ml.). An ethereal solution of diazomethane was added to the suspension until a permanent yellow coloration was obtained and most of the solid material had gone into solution. The solution was filtered and the filtrate reduced to dryness. The crystalline residue (2.1 g.), M.P. 94–96°, was recrystallized from Skellysolve B (petroleum ether, B.P. 60–68°) to give off white crystals, M.P. 95–96°.

*Analysis.*—Calcd. for $C_{13}H_{10}N_3O_2F_3$: C, 52.52; H, 3.39; N, 14.14. Found: C, 52.75; H, 3.47; N, 14.25.

Example 6

Substitution in the procedure of Example 1 for the α,α,α-trifluoro-m-toluidine used therein of 0.0863 mole of α,α,α-trifluoro-o-toluidine and α,α,α-trifluoro-p-toluidine, respectively produces 5-ethoxycarbonyl-4-(α,α,α-trifluoro-o-toluidino)pyrimidine and 5-ethoxycarbonyl-4-(α,α,α-trifluoro-p-toluidino)pyrimidine, respectively. Saponification with potassium hydroxide by the procedure of Example 2 converts these ethyl esters to the corresponding free acids.

I claim:

1. A member selected from the group consisting of an acid of the formula

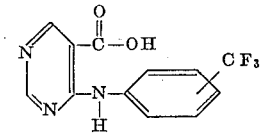

and nontoxic, pharmaceutically acceptable salts and (lower)alkyl esters thereof.

2. A compound of the formula

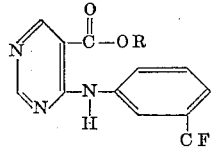

wherein R represents (lower)alkyl.

3. A compound of the formula

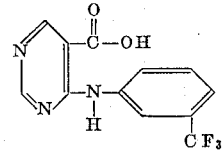

4. A compound of the formula

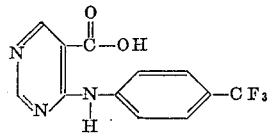

5. A compound of the formula

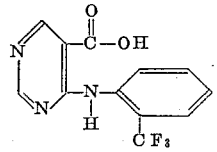

References Cited by the Examiner

UNITED STATES PATENTS

3,118,754   1/1964   Nickell     260—256.5

OTHER REFERENCES

Peters et al.: Jour. Org. Chem., vol. 25, pages 2137–2142, December 1960.

Yale, Journal of Medicinal and Pharmaceutical Chemistry, vol. 1, No. 2, pages 121–133, 1959.

References Cited by the Applicant

UNITED STATES PATENTS

| | | |
|---|---|---|
| 2,724,710 | 11/1955 | Duschinsky. |
| 2,728,768 | 12/1955 | Leanza et al. |
| 2,785,161 | 3/1957 | Steck. |
| 2,862,974 | 12/1958 | Sieglitz. |
| 2,891,953 | 6/1959 | Clark et al. |
| 2,917,509 | 12/1959 | Druey. |
| 2,921,071 | 1/1960 | Druey et al. |
| 3,037,022 | 5/1962 | Lowrie. |

FOREIGN PATENTS

61/832   6/1961   South Africa.

OTHER REFERENCES

Mitsui, S., and Saito, H.: C.A., 53, 5275–5276 (1959).

NICHOLAS S. RIZZO, *Primary Examiner.*

MARY O'BRIEN, *Assistant Examiner.*